March 10, 1964     R. EDWARDS ET AL     3,124,674

DATA COLLECTION AND DISTRIBUTION SYSTEM

Filed May 19, 1961     6 Sheets-Sheet 2

FIG. 2.

INVENTORS:
ROBERT EDWARDS
WILLIAM A. WHEATLEY
BY
*Brumbaugh, Free, Graves & Donohue*
THEIR ATTORNEYS

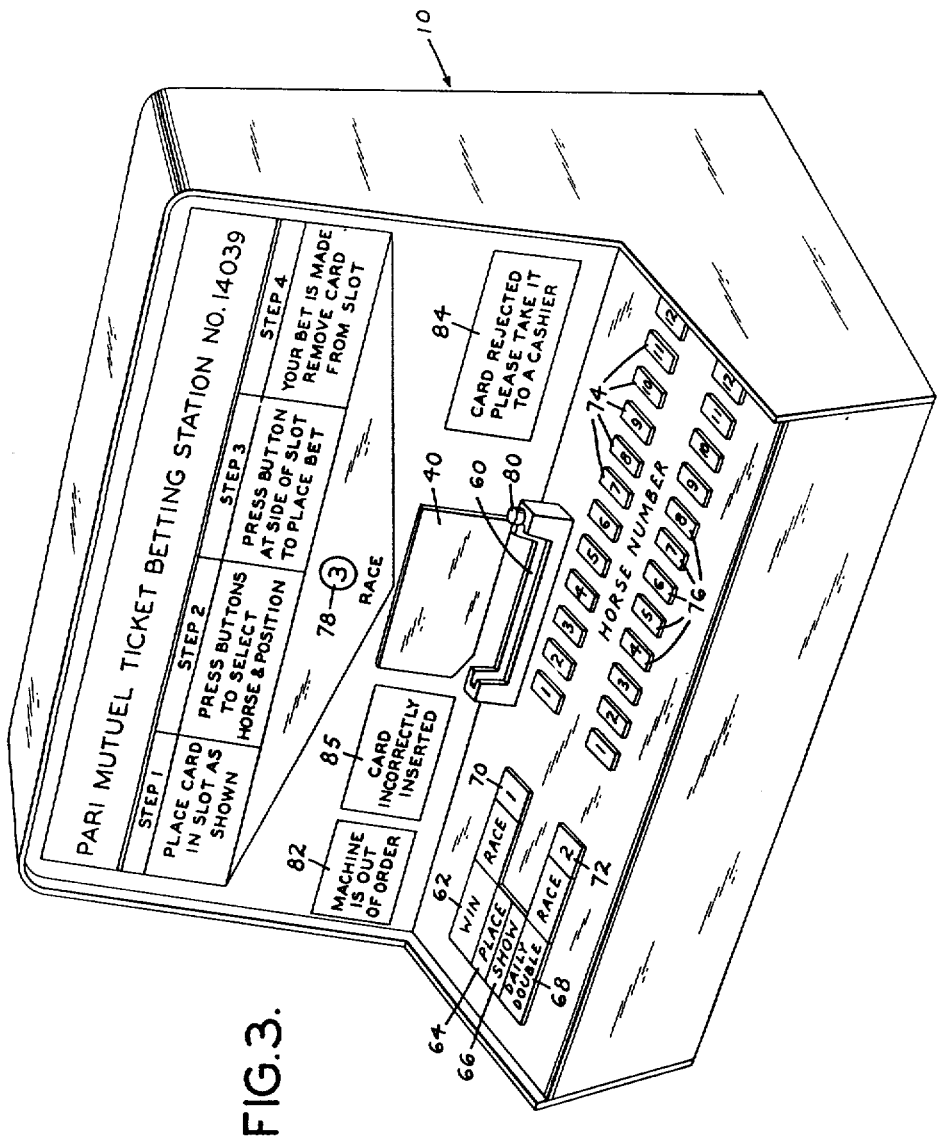

March 10, 1964  R. EDWARDS ETAL  3,124,674
DATA COLLECTION AND DISTRIBUTION SYSTEM
Filed May 19, 1961  6 Sheets-Sheet 4
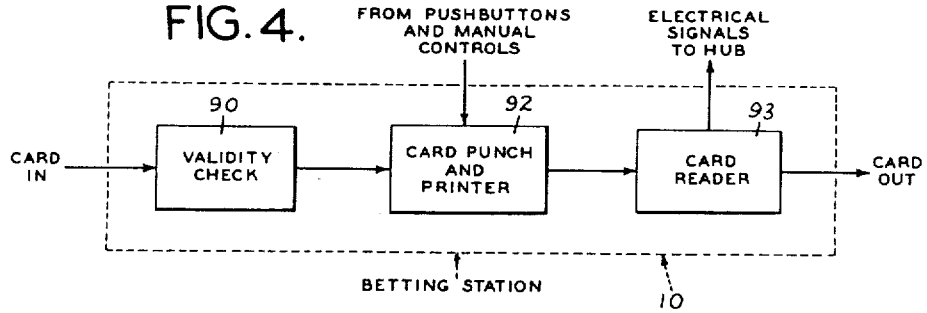
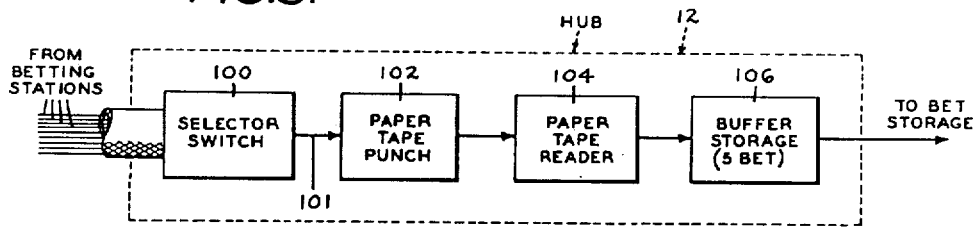
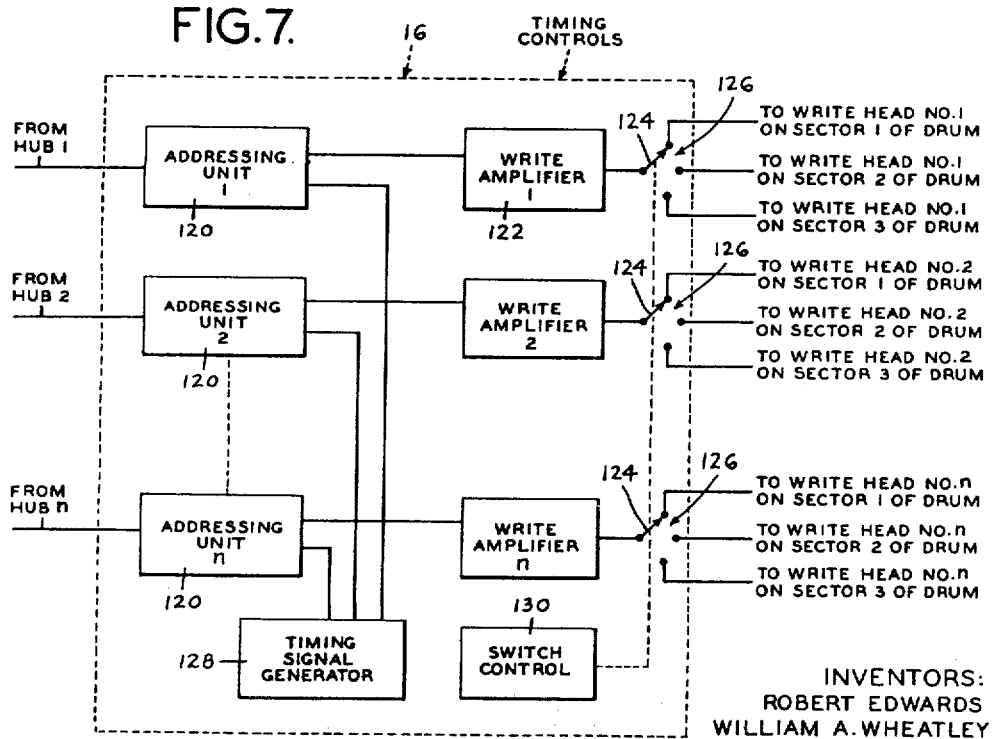
INVENTORS:
ROBERT EDWARDS
WILLIAM A. WHEATLEY
BY
THEIR ATTORNEYS

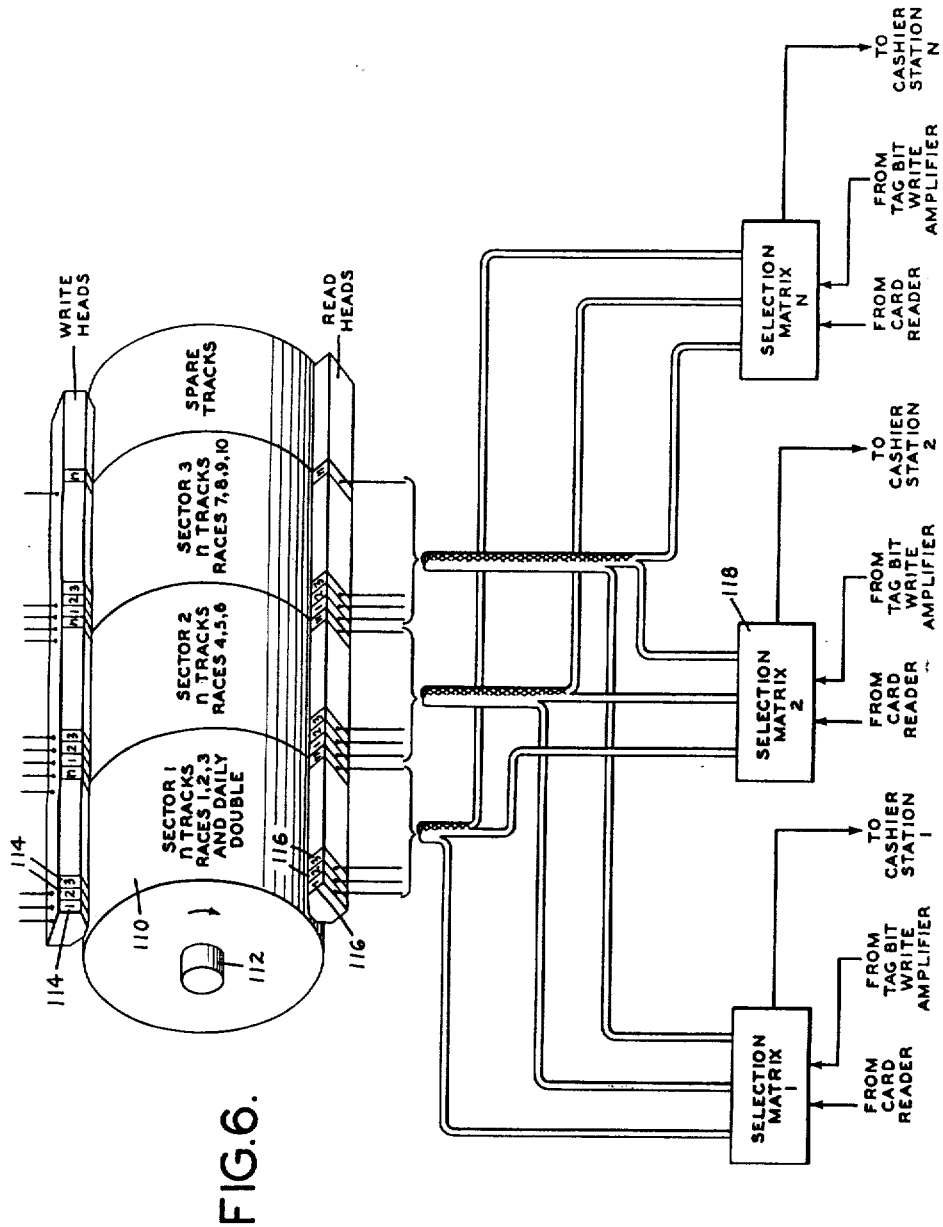

United States Patent Office 3,124,674
Patented Mar. 10, 1964

3,124,674
DATA COLLECTION AND DISTRIBUTION SYSTEM
Robert Edwards, Westfield, N.J., and William A. Wheatley, Ypsilanti, Mich., assignors to Electronic Assistance Corporation, Red Bank, N.J., a corporation of New York
Filed May 19, 1961, Ser. No. 111,232
15 Claims. (Cl. 235—61.1)

This invention relates to data collection and distribution systems, and more particularly to systems of this type adapted to implement parimutuel betting procedures.

Horse racing, in all its forms, has been long established as a leading spectator sport, from an attendance point of view. Perhaps the principal attraction of this sport is the fact that the spectator, by being permitted to wager on a contestant of his choice, is invested with a personal interest in the outcome of each race. To accommodate the increasing multitude of enthusiasts, more and more tracks are being built and racing schedules are continually being expanded.

The wagering system in general use at race tracks is of the parimutuel type, wherein betting odds and pay-offs for each race are computed solely on the basis of the number and aggregate amount of bets placed on the entries by the spectators. The track management receives its remuneration in the form of a percentage of the total amount bet, and the various governmental taxes are also deducted therefrom prior to distribution to winning bettors. The amount of money bet therefore, determines the return to the track operators and tax revenues, as well as the pay-off to the successful bettor.

To implement the above described betting system, a large number of manned betting windows are provided, generally located in a section or sections of the track structure convenient to the spectator area. These windows are segregated according to the amount of the bet they can accept, e.g. $2.00, $5.00, $10.00 etc., and a patron wishing to make a $2.00 bet must go to a $2.00 window and so forth for each denomination. To place his bet, the bettor goes to the prescribed window, indicates verbally to the cashier the number of the horse and the pool (win, place, show, daily double) in the forthcoming race on which he desires to place his bet, and gives the required amount of money to the cashier, who then issues the betting ticket. As the bets are placed, information from the betting windows is fed to a central calculator which computes the odds and pay-offs on the basis of the bets being made. The results are conveyed to a large display board centrally located in the track infield and in full view of the spectators. At the conclusion of the race, holders of tickets on winning horses present them to cashiers at designated windows for payment in accordance with the pay-off previously computed.

While the above-described manual system may have been adequate for track operation in the past, the present day popularity of the sport and the number of spectators desiring to wager on the individual races have made this arrangement impractical and unprofitable. In many instances, lines at betting windows become so long that numbers of patrons are unable to place their bets in the short interval between races during which bets are accepted. Furthermore, crowds of anxious bettors desiring to reach the windows in time to place their bets have rendered the entire operation uncomfortable to all concerned. Not only has this outmoded system prevented a great many prospective bettors from placing their bets, but it has generally detracted from the public's enjoyment of the sport.

Attempts have been made to alleviate this situation by application of automatic techniques to the betting process. However, while the automatic computation of odds and pay-off has been successfully achieved, the various proposals for simplification of the betting and pay-off processes have been either so cumbersome or so subject to counterfeiting, that they have been abandoned. These prior simplification proposals have been advanced on a piecemeal basis, that is, a single facet of the operation has been considered in each case, without regard to the system as a whole. The arrangement of the present invention, by treating the entire parimutuel operation as a whole, overcomes these drawbacks and provides a complete, unitary system for race track betting whereby a greater number of individual bets may be processed in a given time than has been possible heretofore, and with little or no possibility of counterfeiting.

Accordingly, it is the primary object of the present invention to provide a novel data collection and distribution system particularly adapted for use in a parimutuel wager operation.

Another object of this invention is to provide a data collection and distribution system capable of accepting at random a great many data inputs and assembling them into a readily accessible form.

Still another object of this invention is to provide a data collection and distribution system adapted for use in a betting system wherein the possibility of tampering or counterfeiting is minimized.

Yet another object of this invention is to provide a betting system wherein wagers are placed under control of the bettor alone and wherein pay-off is accomplished substantially automatically.

A still further object of this invention is to provide a betting system for race track use wherein post-race accounting and auditing may be accomplished by using the betting tickets themselves as the information input.

An additional object of this invention is to provide a race track betting system wherein varying rates of flow of input data may be readily and smoothly accepted.

In accordance with the present invention, the track patron, upon entering the track, purchases any desired number of betting tickets from windows provided for this purpose. These tickets may, in a preferred embodiment, be similar to conventional punched cards used for automatic accounting purposes. The tickets purchased will have the value of the ticket and the date of issuance pre-punched therein and also printed on the surface, so as to be readable by the purchaser. Distributed throughout the spectator area of the track are a large number of individual betting stations. To place a bet, the patron merely inserts a betting ticket of desired denomination into a receptacle in the betting station and presses suitably provided buttons to indicate the betting pool and post position of the horse selected. The betting ticket is punched and printed with this and other information and returned to the bettor.

The information relative to the bet is transmitted in the form of electrical signals from the betting station to a central data storage unit. The data thus collected from all of the betting stations at the track is stored on this unit. At the same time, this information is fed to a computer, wherein the odds and pay-off information is calculated during the betting time. There is also provided the usual display board in the track infield for observation by the patrons. The information from the central storage unit is also supplied to a plurality of cashier stations which may be located in any suitable part of the track structure.

At the conclusion of the race, holders of winning tickets may present them to the cashiers at the above-mentioned cashier stations. The cashier merely inserts the ticket in his apparatus and the amount of pay-off, in dollars and cents, is visually indicated to him and the patron. The apparatus at the cashier station, in addition to indicating the amount of the pay-off due on the ticket inserted, includes means for comparing the information on the ticket with information previously stored in the main storage unit, to determine its validity. The payment of the winning ticket also causes insertion of an additional bit of data in the main storage unit to indicate that that particular bet has been paid. Should another ticket be presented with the same information punched therein, the presence of this added bit of information in the main storage unit indicates to the cashier that the bet had previously been paid and that the additional ticket is suspect. This, together with other arrangements in the betting stations which will be described in detail hereinafter, enables the system to be virtually free from the possibility of counterfeiting or other unauthorized operation.

The foregoing and other objects, features, and advantages of the present invention will be more readily apparent from the following more detailed description thereof when taken in conjunction with the accompanying drawings, in which:

FIGURE 2 is a pictorial representation of a typical betting card for use with the present invention;

FIGURE 3 is a pictorial representation of a betting station suitable for use in the system of FIGURE 1;

FIGURE 4 is a block diagram of a preferred form of betting station usable in the system of FIGURE 1;

FIGURE 5 is a block diagram of a preferred form of the hubs shown in FIGURE 1;

FIGURE 6 is a schematic representation of a magnetic drum and associated apparatus for use as the bet storage means of the present invention; and FIGURE 7 is a schematic diagram of the timing controls 16 shown in block form in FIG. 1.

Figure 1:
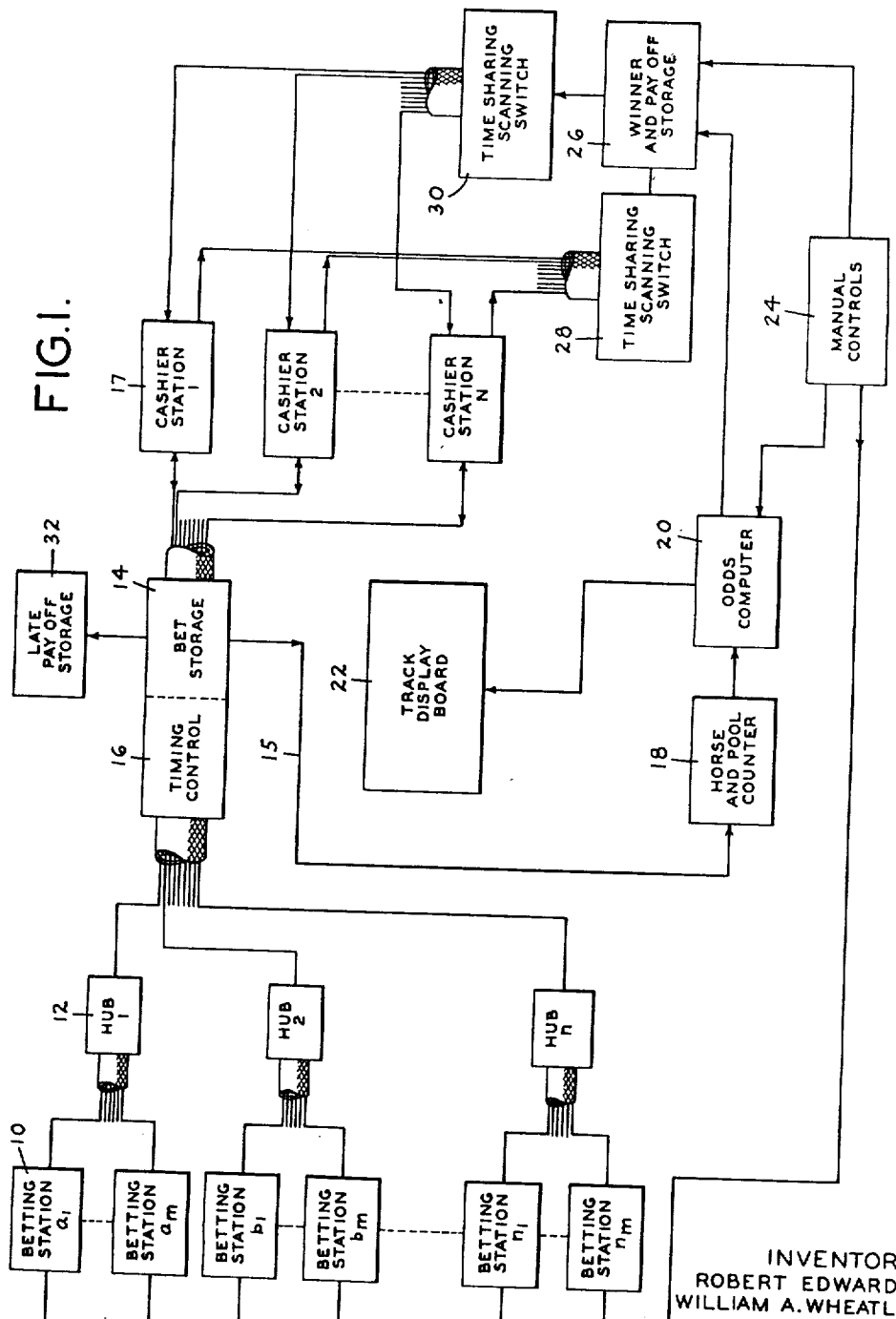
FIGURE 1 is a block diagram of the entire betting system of the present invention, in accordance with the preferred embodiment thereof.

The complete betting system according to the invention is illustrated in block form in FIGURE 1. As shown therein, there are provided a plurality of individual betting stations 10, which are scattered throughout the spectator area of the track. The stations are divided into groups, which may be composed of any convenient number of individual units. As shown in the drawing, a given system may comprise "$n$" groups of betting stations, each of which may include any number, $m$, of individual stations. The individual stations of each group are preferably physically distributed around the track in such a manner that the average usage of each group of stations is approximately the same. Thus, rather than have all the stations of one group located, for example, in the grandstand area of the track, some of them may be located in the clubhouse area and others in the standing area. A distribution of this nature permits the system to accept the greatest number of bets during periods of peak betting activity.

The betting stations of each group are coupled to hub units 12, one of which is provided for each of the "$n$" groups. The purpose of these hubs, which will be described in detail hereinafter, is to accept the randomly placed bets from the individual betting stations, collate them, and present them in a relatively constant stream to the main storage unit of the system.

The outputs of the hubs 12 are connected in common through a timing control 16 to a main bet storage means 14. The bet storage means is capable of accepting and storing information completely identifying all of the bets placed at all of the betting stations for a single day's racing activity. Preferably, this storage unit comprises a magnetic drum of sufficient capacity, but any conventional information storage medium of suitable size may be used. It will be understood, of course, that the bet storage unit includes means to "write" bet information into its storage area and means to "read" information therefrom for utilization by other components of the system. An additional storage means 32 is coupled to the main storage unit for recording unpaid winning bets remaining in the main storage at the end of the racing day. The storage means 32, which may be a magnetic tape unit, provides the information required to permit cashing in of winning tickets any time after the race.

The bet information supplied to the storage unit 14 is also sent via conductor 15 to the horse and pool counter 18. The latter comprises means to total the bets placed on each horse in the race segregated according to the betting pools, i.e., win, place, show, and daily double. These totals are fed to an odds computer 20, which calculates the betting odds for each horse entered in the race in accordance with parimutuel operation. The computed odds are supplied to a track display board, or "tote" board, which generally is located in the track infield in clear view of the track spectators. The units 18, 20 and 22 may be of the type presently in use at parimutuel tracks.

The output or reading apparatus of the storage unit 14 is coupled to each of the cashier stations 17. As indicated, this coupling permits two way transmission of signals, and actually comprises a plurality of separate conductive channels. These channels, as will be described in more detail hereinafter, permit interrogation of the storage medium by the cashier station and the return of information thereto in response to the interrogation.

For providing information relative to winning bets to the cashier stations 17, a winner and payoff storage unit 26 is provided. This unit comprises a storage matrix of any convenient form, such as a cross bar switch or magnetic core matrix, and holds information identifying the winning horses and the computed returns for use in the cashier stations. A set of manual controls 24 is provided which, at the conclusion of the race, are actuated to cause the odds computer 20 to transfer information to the winner and payoff storage relative to the winning horses. Upon placing of a winning betting ticket in a cashier station 17, the pertinent betting data is sent via scanning switch 28 to interrogate the winner storage 26. The storage unit 26 thereupon returns information relative to the amount due on the winning ticket through scanning switch 30 to the cashier station making the inquiry. The amount of the payoff is visually displayed on an indicator at the cashier station.

As shown in FIG. 1, the manual controls 24 are also coupled to each of the individual betting stations. By means of simple switching arrangements, these controls turn power on and off at the stations, render them inoperative at the proper time prior to the running of the race, and turn them on again during the betting period for the following race. These and other manually controlled functions will be discussed in more detail hereinafter.

Upon entering the track (or at any time during the racing day) the patron purchases, from automatic ticket vending machines or manned windows provided for this purpose, any desired number of betting tickets, which may conveniently be of the type illustrated in FIGURE 2. As shown therein, this form of betting ticket is generally similar to the punched card used in well known commercial accounting systems. It will be apparent, of course, that the ticket may be of any convenient shape or size and adapted for use with any desired accounting arrangement. When purchased, the card, indicated generally at 40, includes an imprint thereon 42 indicating the value of the card (in this case $10), and a color band 44 along one edge thereof which is also keyed to the dollar amount of the ticket. Alternatively, the entire card may be colored. The card also includes a clipped corner 46 to aid in the proper insertion thereof into the betting station. In accordance with a conventional accounting usage, the card may be divided into a series of rows and columns for determining the coding of the punches to be placed therein and the punches may be in the form of rectangular holes 48. Alternatively, round or other shaped punches may be used. The rows are designated in the drawing by the numbers 0 to 9 appearing outside the left edge of the card and the columns by the numbers 1 to 27 appearing above the top of the card. These numbers do not appear on the card itself and are shown in the drawing only to explain a suitable form of card coding. It will be realized that the particular betting ticket illustrated and described herein is merely exemplary of the many shapes and coding arrangements which will occur to those skilled in the art.

The betting card 40 is divided into a number of vertically separated sections or fields, each of which is designated to hold information indicative of a particular characteristic of the bet being placed, as indicated in the drawing, and may include one or more columns. For example, columns 1 and 2 comprise a field identifying by number the betting station used by the bettor to place his bet and columns 3 to 5 identify the number of the hub to which the betting station is coupled.

Prior to purchase by the bettor, the face value and date of purchase are punched in the card. The value of the card is entered in the field including columns 12, 13 and 14, and for the $10 card illustrated, includes a punch in the 1 row in column 13 (which is the tens unit of the field) and punches in the zero row of columns 12 and 14. The date may be punched in columns 22 through 27 in accordance with this coding arrangement, however, as a means of preventing counterfeiting of betting cards, it is preferable to enter under the date columns a prearranged pattern of punches which will not be readily decipherable. The pattern can be varied daily and in a random manner known only to track officials, thereby rendering unauthorized duplication of betting cards impossible prior to the racing day. In addition to being punched in the value and date fields, the value and date information will be printed at the top of the card beneath the appropriate headings so as to be readable by the card purchaser and track officials.

The betting card is provided with a score 50 near its right hand edge whereby the portion 52 may be readily detached. This score is located so as to leave the information bearing portion of the card (to the left of the score) of a standard size usable in commercial punched card accounting equipment. The segment 52 is provided to receive a reject stamp from the betting station should the ticket be found to be invalid. Below the portion of the card set aside for punching the betting data may be provided an imprint of the track name and any other printed matter desired. Also in this area, a space is provided for a "bet made" punch 54, which in a preferred embodiment, is a large circular hole.

In FIGURE 3 is shown the console of a typical betting station in accordance with the present invention, as it would appear to the bettors. As shown, the console includes a card receiving receptacle 60 into which the card 40 is placed preparatory to making the bet. Spaced on the lower panel of the console are a plurality of manually actuated buttons by means of which the bettor indicates his individual preference in the coming race. The desired betting pool is selected by depressing one of the buttons 62, 64, 66 or 68, which represent the win, place, show and daily double pool respectively. In accordance with established racing procedures, the daily double pool is available to the bettor during a period preceding the running of the first race. Thereafter, the button 68 is locked against operation by means of the manual controls 24 (FIG. 1).

Also on the lower panel are two series of buttons representing the post positions or numbers of the horses entered in the race. Normally, only the buttons 74 are operative. However, during the daily double betting period, both rows of buttons 74 and 76 are rendered operative in response to actuation of button 68 and, as identified by indicators 70 and 72, represent means for selecting the horse in the first and second race, respectively, to complete the daily double selection. At the conclusion of the daily double betting period, the buttons 76 are locked up from the manual controls 24 and rendered inoperative. The buttons 74 and 76 may also be individually locked against operation under control of the manual controls 24, to take care of "scratched" entries and races having fewer entries than the buttons provided.

On the upper panel of the console, directions to aid bettors in placing their bets may be indicated as shown. If desired, a sequential lighting arrangement may be supplied whereby the several steps involved in placing the bet may be successively lighted as they are to be performed. An illuminated indicator 78 is also provided on the upper panel which is controlled from the manual controls 24 to indicate to the patron the number of the race in which the bet is to be placed. An out-of-order indicator 82 and a rejected card indicator 84 are also provided thereon to signal the bettor of the condition described. To insure that betting tickets are properly inserted in the slot 60, a pair of normally closed switch contacts are provided, which will be opened by a corner of a card. When properly inserted, the clipped corner 46 of the card does not separate the contacts. These contacts are so connected that, when opened, they prevent any further operation of the betting station and illuminate the indicator 85.

Assuming that the card inserted by the bettor has been placed in the slot properly, the patron places his bet in accordance with step 2 indicated on the upper panel of the betting station. The bettor depresses the button of the desired betting pool and the button corresponding to the desired horse number, or numbers in the case of the daily double. Once this is complete, the patron presses the button 80 at the side of the card slot 60 to lower the betting card into the apparatus.

A block diagram of the apparatus included within the betting station illustrated in FIGURE 3 is shown in FIGURE 4. This apparatus comprises a validity checking means 90, a card punch and printer unit 92 and a card reader 93. The validity checking unit 90 is preferably arranged to contain two independent checking features. One of these, which may conveniently consist of a simple microswitch, is used to detect the presence of a bet made punch 54 (see FIGURE 2) in the card placed in the station. The other is a card reading arrangement for sensing the date code punched in columns 22 to 27 of the card. Although conventional card reading apparatus may be used for this purpose, any simple, hole sensing arrangement may be used, for example, a light source and photoelectric cell combination. Since the presence of only six holes and the absence of any other holes are to be sensed and the pattern need be changed only once a day, such a sensing device is preferable. It is desirable to check the date code at the betting station to prevent outdated cards from being bet. The holder of outdated, unbet cards may exchange them for current equivalents at the issuing windows.

Should the card placed by the bettor in the slot 60 in the betting station contain either the bet made punch or an improper date code the validity checking device 90 will prevent acceptance of the card and the reject stamp will be imprinted on the portion 52. In addition, the card rejected sign 84 will be illuminated and further processing of a bet on the card will be rendered impossible. As an added safeguard against counterfeiting, the card may also be provided with an invisible but photoelectrically or magnetically responsive portion 53, the detection of which by the unit 90 is necessary prior to further processing of the bet.

Referring again to FIGURE 4, the depression of the button 80 lowers the card into register with the validity check apparatus 90, which proceeds to make the above-described tests. If the card is determined to be genuine, the card punch and printer mechanism 92 is actuated. This apparatus comprises card punching means for providing the holes 48 in the card and printing means for providing the row of print across the top of the card, which enables the patron and the cashier to visually interpret the information punched therein. This card punch and printer may be of any commercially available type capable of accepting the card 40, suitably modified to provide the information desired in this particular application. Such conventional apparatus includes a plurality of punches and mating dies therefor between which the card passes. Actuation of the punch in response to the pressing of a button or key makes the hole.

As shown in FIGURE 4, the individual dies and punches of the unit 92 are actuated under control of buttons on the panel of the betting station illustrated in FIGURE 3, as limited by any lockout controls from manual controls 24. Referring to both FIGURES 2 and 3, it will be apparent that the punch in the pool column 15 of the card will be selected on the basis of the individual buttons 62, 64, 66 and 68 depressed by the betting patron. In one convenient code, a punch in the 1 row signifies the "win" pool, a punch in the 2 row indicates the "place" pool, a 3 punch the "show" pool, and a 4 punch the daily double. For a daily double bet, the horse number for the first race will be punched in columns 18 and 19 in response to actuation of a button 74 and the selection for the second race will be punched in columns 20 and 21 by actuation of a button 76. All other bets are placed by actuation of one of the buttons 62, 64, 66 and a button 74, resulting in appropriate punches in columns 15 and 18 and 19, respectively.

As mentioned previously, the value and date punches have been entered prior to purchase of the ticket. Columns 1 through 11 of the card, which include information relative to the identification of the specific bet, are not under the bettor's control. Columns 1 and 2 provide indications of the particular betting station within a given group at which the bet is placed, while columns 3, 4 and 5 identify the hub to which that betting station is coupled. Columns 6 through 11 provide a serial number for the given betting station, which changes by one digit with each successive bet placed, for further identification purposes. It will be seen that columns 1 through 11 and 22 through 27 of the card provide data to the track operator which enables him to quickly determine where and when a particular bet was placed, thereby to assist him to identify and repair if necessary, any malfunctioning betting station. The punches for columns 16 and 17, which identify the race number on which the bet is placed, are under control of the manual unit 24 (FIGURE 1) which at the same time operates the race number indicator number 78 in the betting station console. The punch for producing the bet made hole 54 is operated in response to depression of button 80 which also serves to actuate all of the other selected punches in the mechanism to perform their functions.

Immediately following the punching operation, the card is fed to a standard card reader 93, which produces a series of electric signals representative of the information punched in the card. As in the case of the card punch 92, the card reader may be a conventional, commercially available unit, simplified to accommodate only the data necessary for this operation. If desired, horse and pool information signals may be generated directly in response to actuation of the punches, rather than in a separate reading operation. At the conclusion of the card reading operation, the card is returned to the bettor. In a preferred embodiment, the card is returned through the same slot 60 by which it entered the console, although if desired, a separate exit port may be provided. The patron now has in his possession a uniquely identified bet card.

The electrical signals from the card reader 93 of each of the betting stations is conveyed via suitably provided conductors to its respective hub 12. These signals are generated at random times by the various betting stations scattered throughout the track and the hub means, shown in detail in FIGURE 5, insure a relatively even flow of information to the system's main storage unit 14. As shown in FIGURE 5, each hub includes a selector switch 100 which sequentially couples the signals from individual betting stations into a common input channel 101. The unit 100 samples all of its associated betting stations in sequence until it reaches one with a bet ready to be placed. It then dwells on that station for a time sufficient to couple the bet information via channel 101 to a conventional paper tape punching unit 102, which in accordance with well known principles, converts the card code transmitted by the card reader 93 in the betting station to a suitable paper tape code. All of the information previously entered on the betting card 40 is now punched in the paper tape to provide a permanent record of the betting information. The switch unit 101 then advances in sequence through the inputs from the betting stations until it locates another betting station which is prepared to place a bet.

The paper tape produced by the punch 102 is fed to a variable length loop or bin which permits information to be punched in the tape more rapidly than it is read out. The exit end of the loop is then fed directly to a conventional paper tape reader. The reader 104 converts the holes in the paper tape to a series of electrical signals which may be coded in accordance with any of the standard computer codes. In the present application, for example, a pure binary or a binary coded decimal system may be utilized. These signals are fed to a small storage unit 102 which has a capacity sufficient to hold the signals representative of the data of a given number of bets e.g. five, at any one time. This buffer storage unit is designed so that information may be entered therein at speeds compatible with the paper tape reader and read out therefrom at a much higher speed. In a preferred form, the buffer storage is composed of square loop magnetic cores arranged in a matrix, as is well known in the art.

In operation, the selector switch 100 in each of the hubs continually and sequentially connects to the respective betting stations of its group. Whenever an output signal appears on the line from one of the betting stations, it is supplied to the input of paper tape punch 102 which proceeds to punch the information onto the paper tape. The paper tape reader 104 is under control of the five bet storage units 106 and transmits five bet segments thereto as soon as the five bets previously stored have been transferred to the main storage unit of the system. Since the paper tape reader need not operate at the same rate as the paper tape punch, it will be seen that this arrangement serves to provide a constant flow of information to the buffer storage unit from the relatively irregular signal input supplied by the betting stations of the group. In addition, the paper tape produced in unit 102 provides a permanent record of the bets being made, which would be of value for accounting purposes or in the event of malfunction in the system. In small systems having relatively few betting stations, the hubs may not be necessary and the betting station signals may be coupled directly to the main storage unit.

As shown in FIGURE 1, the outputs of the hubs 12 are coupled to the main storage unit 14 through a set of timing controls 16. A suitable arrangement for a magnetic drum storage means is shown in schematic form in FIG. 6. The drum is of conventional type and comprises a generally cylindrical surface 110 made of a magnetizable material. The cylinder thus formed is mounted on a shaft 112 for rotation as indicated by the arrow. In use, the drum is maintained continually rotating at a constant speed by suitable motor drive means (not shown). For identification or "address" purposes, the surface of the drum is divided into a series of bands, or tracks. Each of these tracks has associated therewith an individual write head 114 for entering data onto its respective track, and a read head 116 for reading or sensing the information stored in the track. In practice, the read and write heads for each track may be combined in a single dual purpose head. The reading is non-destructive in nature in that the sensing of the magnetized spots on the drum surface does not cause demagnetization thereof, and these same spots may be repeatedly sensed. Application of an input to write head however, effectively erases information previously stored on the drum surface beneath the head and then writes the new information thereon. Although each of the read and write heads is illustrated as being of a solid type, it is to be understood that each of these heads may comprise a plurality, for example 7, separate segments, each corresponding to an individual sub-track within the main track, in accordance with the particular code being used. For purposes of the present example, the surface of the drum is functionally divided into 3 separate sectors, although any number of sectors can be used. The first such sector, comprising n tracks (one for each hub), is set aside for the storage of bets placed on the first, second, and third races and the daily double. The second sector, which is of the same size, is set aside for races 4, 5 and 6, while the third sector, likewise of the same capacity, is set aside for races 7, 8, 9 and 10. If desired, a group of spare tracks may be set aside for possible overflow.

The read heads 116 are individually coupled to each of a plurality selection matrices 118, which preferably are of the diode type, as is well known in the art. These matrices enable any one of the read heads 116 to supply an output to any one of the N cashier stations 17 under control of the latter. A separate matrix 118 is provided for each cashier station, although, if desired, a single matrix may be used for all the cashier stations on a time-sharing basis.

The timing control, 16, for the storage unit is illustrated in FIGURE 7. As shown therein, each of the N hubs is connected to an addressing unit, 120, which in turn is connected to a write amplifier, 122, and thence to the wiper, 124, of a three-position switch, 126.

The function of the addressing unit, 120, is to "remember" how much of its associated track has been filled with bet data and to cause new bet data to be placed immediately following the old. The addressing unit consists principally of an address counter and a comparator. Each track of the drum is divided functionally into segments, each segment being adequate to store data on five bets. The segments are numbered sequentially around the drum, the number of a segment being referred to as its "address." The address counter holds the address of the first unoccupied segment of the track and sends this information to the comparator. A timing signal generator, 128, common to the entire drum, holds the address of the next segment to pass under the write heads and sends this information to the comparator. When the comparator finds an identity between these two addresses and is receiving a signal from the hub indicating that the hub has data on five bets ready to transmit, the comparator causes timing signals to be sent to the buffer storage 106 which causes the information contained therein to be transmitted to the write amplifier and written on the drum. Then the address counter is caused to advance one count, so that the next block of five bets will be written in the next segment. If, at the time the comparator finds an identity between the address received from the timing signal generator and that received from the address counter, and there is no signal from the hub indicating that the hub has data on five bets ready to transmit, the comparator takes no action; and the next vacant segment passes under the write head without being written upon. It will require a full drum revolution before it is again available for writing, and during this time the hub will perhaps accumulate data on five bets so that a data transfer can take place.

Such addressing units are commonly used in digital computer systems and are well known in the art.

The controls 16 also include a switch control 130. The switch control 130 may be manually actuated from the controls 24 and serves to rotate the wipers 124 between positions on the switches 126. At the beginning of a racing day, the wipers 124 of the switches would all be in their topmost position, in effect coupling the hubs to the write heads located on the first sector of the magnetic drum. It will be noted that there are n write heads provided for each sector, one for each of the hubs.

As indicated in FIGURE 6, the capacity of a single sector of 100 tracks is chosen so that it can accept all the bets placed in from 3 to 4 separate races. At the end of the third race for example, the switch control 130 is actuated through manual controls 24 to advance the switch arm 124 to its second contact. The arm 124 is advanced again at the end of race 6. It will be appreciated from the foregoing, that all of the bets transmitted through hub 1 will be recorded in the first track of each sector and hub 2 in track 2, etc.

Figure 8:
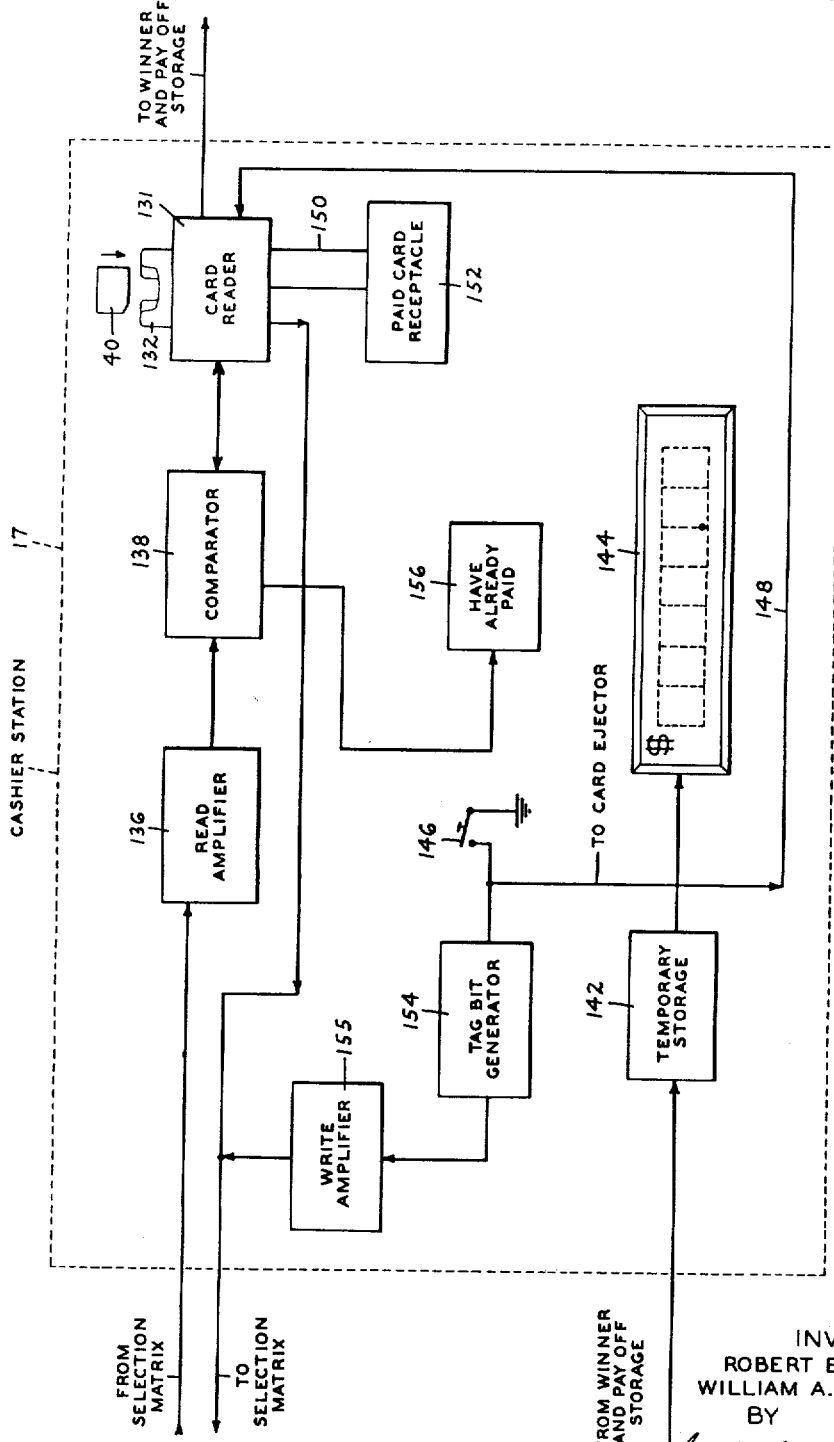
FIGURE 8 is a block diagram of the cashier station for use in the system of FIGURE 1.

As discussed above, upon the termination of the race, information regarding the winners and their respective payoffs is entered in the winner and payoff storage unit 26 (FIG. 1) (which if desired, may actually comprise a portion of the main storage medium 14), for use by the cashier stations 17. A typical cashier station according to the present invention is shown in FIGURE 8. This apparatus includes a card reader 131 having a receptacle 132 into which the betting cards 40 are deposited. The card reader 131 may be of any conventional type, such as the card reader 93 in the betting station, and suitably adapted to read the information on the betting cards. The hub and race numbers from the ticket 40 placed in the card reader are decoded and transmitted to the read selection matrix 118 at the storage means 14. This matrix selects the track of the drum corresponding to the hub and race numbers read by the card reader and connects the associated read head output to the cashier station. Thus, signals representing all of the bets recorded on a given track will be supplied to the cashier station.

The bet information signals are amplified by read amplifier 136 and fed to a comparator 138. Also supplied to the comparator 138 are signals representing all of the information punched in the card, as developed by the reader 131. The signals from the selected track of the storage means 14 are applied to the comparator 138 and are compared in sequence with those taken from the betting card. Upon complete identity of one of the sets of stored bet signals with those read from the card, the card reader 131 transmits information specifying the race number, horse number (or numbers in the case of the daily double), the betting pool and the amount of the bet via time sharing scanning switch 28 to be the winner and payoff storage 26. As can be readily appreciated, the switch 28 couples the outputs of the cashier stations in sequence to the storage 26 so that only one interrogation of the winner and payoff storage occurs at any one time. The storage unit 26, upon receipt of the information from the cashier station identifying a winner, responds by relaying information indicating the amount of the payoff due on the particular bet through time sharing scanning switch 30 back to the interrogating cashier station. The switches 28 and 30 are synchronized to respectively couple the same cashier station in and out of the storage 26 at the same time for a length of time sufficient to accomplish the necessary transfer of data. The switches then advance to the next station in the sequence.

The information representing the amount of the payoff is coupled through a temporary storage means 142 to an illuminated indicator 144. The latter is disposed in plain view of both the cashier and the patron and the amount of the payoff is visibly indicated on the face of the unit. The storage unit 142 is provided merely to maintain the indication on the face of the unit 144 for a long enough period to be easily read. If an indicator having a screen of sufficient persistence is used, the storage 142 may be eliminated. The amount due the winning bettor is now indicated to the cashier and payment is made to the waiting bettor. It will be understood that if desired, the cashier station may be coupled to actuate an automatic change making machine, to lessen the possibility of error.

After the payment, the cashier presses the button 146, which most conveniently may be foot-operated. Closure of the switch accomplishes two functions. Firstly, it controls the card reader 131 via a conductor 148 to drop the card 40 through chute 150 into a paid card receptacle 152. The cards of the paid bets are thereby maintained safely for post-race auditing purposes. The switch 146 also serves to actuate a tag bit generator 154. The output of the generator is amplified by a write amplifier 155 and applied through the appropriate selection matrix 118 to the read head, which now operates as a write head. An added bit of data is thus inserted in the data identifying the bet just paid.

The tag bit serves to virtually eliminate the possibility of counterfeiting winning tickets. Once it has been inserted on the drum, should another betting card including the same betting information be inserted in the card reader 131, the presence of the tag bit is detected in the comparator 138 and the indicator 156 actuated. This informs the cashier that the bet has already been paid. The cashier is thus put on notice that the ticket in the card reader is suspect and suitable action may be taken.

Since the storage means 14 is capable of recording all of the betting information gathered during a day's racing, it will be apparent that winning tickets may be submitted for payment at any time during the day. Regardless of when the ticket is placed in the cashier's equipment, the proper information can be read from the storage drum and the indicator 144 actuated. However, for a variety of reasons, patrons holding winning tickets may not have had the opportunity to cash them in prior their leaving the track at the end of the racing day. To accommodate these winning ticket holders during a subsequent visit to the track, late payoff storage means 32 (FIG. 1), is provided. This means preferably comprises a magnetic tape recording device by which information relative to all of the unpaid bets of a given day may be permanently recorded on magnetic tape. The tapes can be conveniently stored for any length of time. To obtain their payoffs, holders of unpaid winning tickets from previous days may present them to a special window or windows provided for that purpose. The magnetic tape is then read in the manner well known in the art and the information therefrom utilized in the cashier's station in the same way as information supplied directly from the storage medium 14. Tag bits are inserted in the tape as the bets are paid.

It will be realized from the foregoing description that many changes and modifications in individual components of the system may be made without departing from the spirit and scope of the invention. For example, while the card punching and reading mechanisms are of conventional form, new configurations thereof will occur to those skilled in the art. Furthermore, although a magnetic drum has been indicated as the preferred form of main storage, it will be realized that any storage medium of suitable capacity, such as magnetic cores or disk files, may be used. Also, other storage media, such as magnetic tape, may be used in place of the paper tape in the hubs, or this storage may be eliminated entirely.

It will also be apparent that the above-described system may be applied as well to off-track betting operations, wherever and whenever such activity is made legal. Moreover, though the invention has been described in terms of an embodiment adapted for application to a parimutuel racing system, it is to be understood that the novel features herein disclosed may be applied to a wide variety of uses. Accordingly, the invention is not deemed to be limited except as defined in the appended claims.

What is claimed is:

1. Data collection and distribution apparatus for use in a parimutuel wagering system comprising, a plurality of randomly actuated data sources, each of said data sources including means to generate electrical signals representing wager data and means to produce a physical record of said data, a plurality of temporary data storage means, each receiving electrical data signals from a different selected group of said sources, main data storage means, means for coupling said temporary storage means to said main storage means to transfer data thereto, a plurality of data output means, means for selectively transmitting data from said main storage means to said output means, each of said output means including means to compare said data transmitted from said main storage means with the data on said physical record, and indicator means operative in response to a predetermined comparison of said data.

2. Data collection and distribution apparatus for use in a parimutuel wagering system comprising, a plurality of manually actuated data sources, each of said sources including means to generate electrical signals and a physical record of wager data entered by manual actuation, a plurality of temporary data storage means, each receiving electrical data signals from a different selected group of said sources, main data storage means, means for coupling said temporary storage means to said main storage means to transfer data to predetermined locations thereof, a plurality of data output means, means for selectively transmitting data from said main storage means to said output means, each of said output means including means to extract the data entered on said physical record, means to compare extracted data with the data transmitted from said main storage means, and indicator means coupled to said comparing means and operative in response to a predetermined relationship between said extracted data and said transmitted data.

3. Data collection and distribution apparatus for use in a parimutuel wagering system comprising, a plurality of manually actuated data sources, each of said sources including means to generate electrical signals and a physical record of wager data entered by manual actuation, a plurality of temporary data storage means, each receiving electrical data signals from a different selected group of said sources, main data storage means, means for coupling said temporary storage means to said main storage means to transfer data to predetermined locations thereof, a plurality of data output means, means for selectively transmitting data from said main storage means to said output means, each of said output means including means to extract the data entered on said physical record, means to compare extracted data with the data transmitted from said main storage means, a source of information signals, means responsive to a predetermined relationship between said extracted data and said transmitted data to select a group of signals from said information source, and means coupled to said information signal source to indicate the content of said selected group of signals.

4. In data collection and distribution apparatus for use in a parimutuel wagering system wherein randomly entered wager data from remote points is collected and stored in a common storage medium, a plurality of wagering stations, means for randomly actuating said stations to provide electrical signals representing wager data, and means to provide a steady flow of signals to said storage medium from said random input comprising, means for sequentially and periodically coupling the outputs of said stations to a common channel, recording means coupled to said channel for making a permanent record of the signals applied to said channel, means for reproducing said signals from said permanent record at a constant rate, and means to couple said reproduced signals to said common storage medium.

5. In data collection and distribution apparatus for a parimutuel wagering system wherein randomly entered wager data from remote points is collected and stored in a common storage medium, a plurality of groups of wager data sources, each of said groups having a plurality of individual data sources, means for randomly actuating said sources to provide electrical signals representing wager data, and means to provide a steady flow of said signals to said storage medium comprising, a common channel for each of said groups, means for sequentially and periodically coupling said sources of each group to its respective common channel, separate recording means for each group coupled to each said channel for making a permanent record of signals applied to said channel, separate means for reproducing said signals from each of said permanent records at a constant rate, temporary storage means coupled to each of said reproducer means for storing a predetermined amount of reproduced data, and means for sequentially transferring the data from said temporary storage means to said common storage medium.

6. The apparatus of claim 5 above wherein said recording and reproducing means operate at a relatively slow rate of speed and said temporary storage means operates at a relatively high rate of speed.

7. The apparatus of claim 5 above wherein said recording and reproducing means comprise respectively a paper tape punch and a paper tape reader, and said temporary storage means comprises a magnetic core matrix.

8. The apparatus of claim 5 above wherein said common storage medium comprises a magnetic drum.

9. Data collection and distribution apparatus for use in a parimutuel wagering system comprising, a plurality of wagering stations, each including means to generate electrical signals representative of wager data and means to produce a physical record of said wager data, a plurality of temporary data storage means, each receiving and storing said electrical signals from a different selected group of said wagering stations, main storage means for receiving and storing data from all of said temporary storage means, a plurality of cashier stations coupled to said main storage means, each of said cashier stations including means to convert data entered on said physical record into additional electrical signals, means for comparing said additional electrical signals with signals received from said main storage means, means for storing data identifying the winners of the contest wagered upon and the returns due on successful wagers, means responsive to identity of said additional signals and said main signals received from said storage means to compare said wager data with said winner identifying data, and means coupled to said last named comparing means to visually indicate the amount of the return due in response to identity of said wager data and said winner identifying data.

10. The apparatus of claim 9 above wherein each of said wagering stations comprises, means to accept a betting card having information prepunched therein, a plurality of manually actuated push-buttons corresponding to all possible wagers in a given race, means responsive to actuation of said push-buttons to punch additional information in said card representative of a selected set of wager data to thereby produce said physical record, and means responsive to all of the punches in said card to generate said electrical signals.

11. Data collection and distribution apparatus for use in a parimutuel wagering system comprising, a plurality of wagering stations for generating electrical signals representative of wager data, storage means for receiving and storing wager data from said wagering stations, means for computing and storing data indicating the returns due on successful wagers and the identities of the winners of the contest wagered upon, a plurality of cashier stations coupled to said storage means, each of said cashier stations including means for generating additional electrical signals representative of wager data, means for comparing said additional electrical signals with wager data signals stored in said storage means, means responsive to a predetermined relationship between said additional electrical signals and said stored wager data signals for comparing the data represented by said additional electrical signals with the winner identifying data, and means responsive to a correspondence between the data represented by said additional electrical signals and said winner identifying data for indicating the return due on the wager.

12. A parimutuel wagering system comprising, a plurality of wagering stations, each including means to generate electrical signals representative of wager data and means to produce a physical record of said wager data, storage means for receiving and storing wager data from said wagering stations, means coupled to said storage means for computing and storing data indicating the returns due on successful wagers and the identities of the winners of the contest wagered upon, a plurality of cashier stations, each of said cashier stations including means operative upon insertion of said physical record to convert the data entered thereon into additional electrical signals, means for comparing said additional electrical signals with signals representative of said winner identifying data, and means responsive to a predetermined relationship between said additional electrical signals and the signals representative of said winner identifying data for indicating the amount of the return due on the wager represented by said physical record.

13. A parimutuel wagering system according to claim 12 further comprising means operative in the absence of said predetermined relationship between the additional electrical signals and the signals representative of said winner identifying data to provide an indication thereof and reject said physical record.

14. A parimutuel wagering system comprising, a plurality of wagering stations, each including means to accept a card inserted by a bettor and manually actuated means to generate electrical signals representative of wager data and provide a record of said wager data on said card, storage means for receiving and storing said wager data signals from said wagering stations, means coupled to said storage means for computing and storing data indicating the returns due on successful wagers and the identities of the winners of the contest wagered upon, a plurality of cashier stations, each of said cashier stations including means operative upon insertion of a completed card to convert the wager data thereon into additional electrical signals, means for comparing said additional electrical signals with the wager data signals stored in said storage means, means responsive to a predetermined relationship between said additional electrical signals and said stored wager data signals for comparing said additional electrical signals with signals representative of said winner identifying data, and means responsive to a correspondence between said additional electrical signals and said winner identifying data signals for indicating the return due on the wager.

15. A parimutuel wagering system comprising, a plurality of wagering stations, each including means to generate electrical signals representative of wager data and means to produce a physical record of said wager data, a plurality of temporary data storage means, each receiving wager data signals from a different selected group of said wagering stations, main data storage means, switching means selectively coupling said temporary storage means to said main storage means to transfer wager data thereto, means coupled to said main storage means for computing and storing data indicating the returns due on successful wagers and the identities of the winners of the contest wagered upon, a plurality of cashier stations, each of said cashier stations including means operative upon insertion of said physical record to convert the data entered thereon into additional electrical signals, means for comparing said additional electrical signals with signals representative of said winner identifying data, and means responsive to correspondence between said additional electrical signals and the signals representative of said winner identifying data for indicating the amount of the return due on the wager represented by said physical record.

References Cited in the file of this patent

UNITED STATES PATENTS

| | | |
|---|---|---|
| 1,761,682 | Reynolds | June 3, 1930 |
| 2,031,298 | Belas et al. | Feb. 18, 1936 |
| 2,084,414 | Simpson | June 22, 1937 |
| 2,639,859 | Serrell | May 26, 1953 |
| 2,800,182 | Hamilton et al. | July 23, 1957 |

OTHER REFERENCES

IBM Reference Manual #A22-6500-3 "704 Data Processing System," 1959.